(12) United States Patent
Baisden

(10) Patent No.: US 6,769,211 B1
(45) Date of Patent: Aug. 3, 2004

(54) BATTLING BUCKS

(76) Inventor: Carroll Lee Baisden, 11599 Chinquapin Dr., Buhl, AL (US) 35446

( * ) Notice: Subject to any disclaimer, the term of this patent is extended or adjusted under 35 U.S.C. 154(b) by 27 days.

(21) Appl. No.: 10/201,978

(22) Filed: Jul. 25, 2002

(51) Int. Cl.7 .............................................. A01M 31/06
(52) U.S. Cl. ............................................................ 43/1
(58) Field of Search .......................... 43/1, 2; 434/296; 84/403, 404; 30/295; 446/397, 418; D22/118, 125; D10/116

(56) References Cited

U.S. PATENT DOCUMENTS

| | | | |
|---|---|---|---|
| D192,338 S | * | 3/1962 | Farber ....................... D22/125 |
| 3,221,444 A | * | 12/1965 | Hettinga ..................... 446/418 |
| 4,610,641 A | * | 9/1986 | Allen .......................... 446/397 |
| 4,850,928 A | | 7/1989 | Stewart |
| 5,325,597 A | * | 7/1994 | Clifton, Jr. ................... 30/514 |
| 5,334,074 A | | 8/1994 | Suminski |
| D369,640 S | * | 5/1996 | Woody, II ................... D22/125 |
| 5,555,664 A | * | 9/1996 | Shockley ......................... 43/1 |
| D376,555 S | | 12/1996 | Gebhardt |
| 5,928,056 A | * | 7/1999 | Molotschko ................ 446/397 |
| 6,289,626 B1 | * | 9/2001 | Williams .......................... 43/2 |
| 6,328,626 B1 | | 12/2001 | Eubanks |

* cited by examiner

Primary Examiner—Kurt Rowan
(74) Attorney, Agent, or Firm—Patent & Trademark Services, INC; Joseph H. McGlynn

(57) ABSTRACT

An apparatus for attracting animals which includes a base with a pair of members attached to the base. Additionally, a handgrip and safety shield are attached to the base. Once the user grasps grasps, with each hand, the respective handgrips, the user strikes them together so that the members will strike each other. The safety shield is attached to the base to prevent injury to the user.

8 Claims, 2 Drawing Sheets

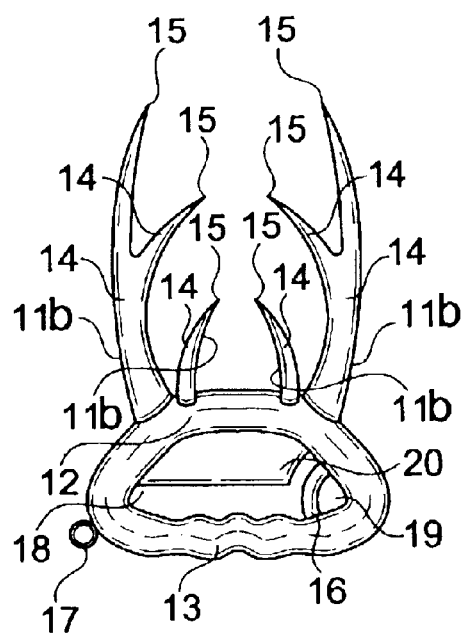
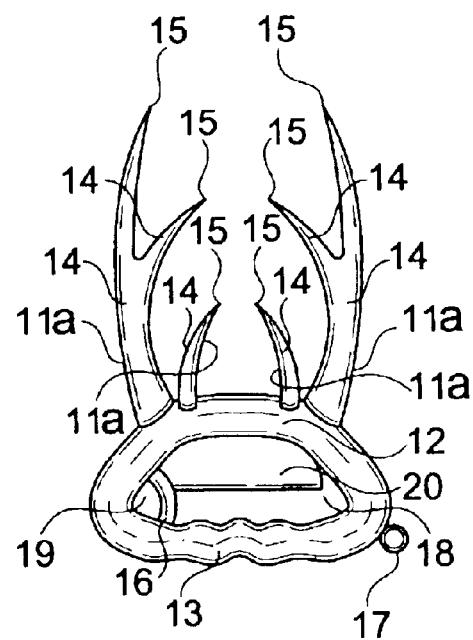
FIG.1A  FIG.1B
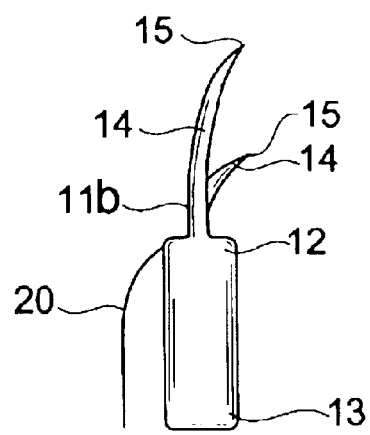
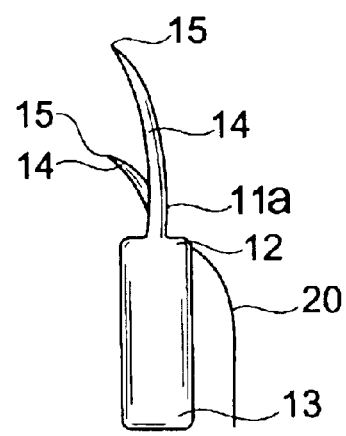
FIG.2A  FIG.2B

BATTLING BUCKS

BACKGROUND OF THE INVENTION

This invention relates, in general, to an improved device for attracting horned animals and, in particular, an improved device that attracts horned animals by imitating the sound of clashing antlers.

DESCRIPTION OF THE PRIOR ART

In the prior art various types of animal hunting devices have been proposed. For example, U.S. Pat. No. 4,850,928 to Stewart discloses a pair of synthetic antlers with a handle and a set of two antlers.

U.S. Pat. No. 4,610,641 to Allen discloses a device for attracting deer having a handle, antlers and a blowing agent and talc.

U.S. Pat. No. 6,328,626 to Eubanks discloses a game call having a striking member and a body member with a plurality of grooves to produce a sound when struck by the striking member.

U.S. Des. Pat. No. 376,555 to Gebhart discloses a design for a deer antler.

U.S. Pat. No. 5,334,074 to Suminski discloses a game call having two parts which make a sound when they are rubbed together.

In contrast to these prior art references and the known prior art, the present invention provides a set of hunting accessories that imitate the sound of horned animals fighting. The hunting accessories have handgrips and thumb braces and a shield.

SUMMARY OF THE INVENTION

The present invention provides a set of hunting accessories that imitate the sound of horned animals fighting and features a base wherein at least a pair of elements is attached thereto. Attached to the base of the present invention is a handgrip that allows a user to securely grasp the present invention and a protective shield is attached to the base.

It is an object of the present invention to provide a new and improved hunting accessory.

It is an object of the present invention to provide a new and improved hunting accessory having a realistic sound duplication of horned animals fighting.

It is an object of the present invention to provide a new and improved hunting accessory that is easy to use.

It is an object of the present invention to provide a new and improved hunting accessory that can be used safely.

These and other objects and advantages of the present invention will be fully apparent from the following description, when taken in connection with the annexed drawings.

BRIEF DESCRIPTION OF THE DRAWINGS

FIGS. 1A and 1B are front views of the present invention.

FIGS. 2A and 2B are side views of the present invention.

DESCRIPTION OF THE PREFERRED EMBODIMENT

Figure 3A:
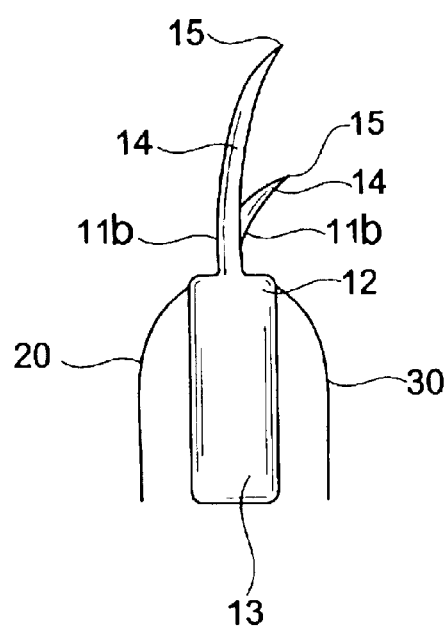
FIGS. 3A and 3B are side views of an alternative embodiment of the present invention.

Referring to the drawings in greater detail, FIG. 1A (held by the user's left hand) and 1B (held by the user's right hand) shows the present invention 10 having base 12, at least one pair of members 11 each of which have at least one elongated member 14 that gradually tapers to tip 15, handgrip 13 and bar 16 which are connected to base 12, attachment loop 17, and protective shield 20. It should be noted that the present invention, as shown in FIG. 1, is merely for illustration purposes only and should not be considered the only shape, size, or form, of the present invention 10. For example, the bar 16 could be on the same side as attachment loop 17.

The present invention 10 may be manufactured from any material known within the art that is rigid, durable and lightweight. Preferably, the present invention 10 is manufactured using unitary construction however; other variations would be within the scope of the present invention 10. For example, actual antler pieces, shown in FIG. 1 as at least one pair of members 11 may be attached to base 12. These antlers could be of numerous varieties, such as 4 or 6 point, thus ensuring numerous points of contact when used. These actual antler pieces may be permanently attached to the base 12 of the present invention 10 during its manufacture or, in other embodiments, the actual antler pieces may be releasably attached to base 12 by means well known within the art. For example, the actual antler pieces may be threaded allowing a user to threadedly attach the actual antler pieces to base 12 of the present invention 10.

Handgrip 13 is attached to base 12 during the manufacture of the present invention 10. Preferably, handgrip 13 and base 12 are of unitary construction and handgrip 13 and base 12 are substantially parallel with respect to one another and are connected to each other by means of a bar 16 and members on either side of base 12 and handgrip 13. Handgrip 13 is designed to be easily grasped in the hand of the user. Bar 16 is attached to both handgrip 13 and base 12 and forms thumbhole 19. As the user grips handgrip 13 through hole 18, the user places their thumb within thumbhole 19 to ensure a firm grip. Additionally, bar 16 provides additional rigidity to the present invention 10. Handgrip 13 may also be encased within a rubber material. This rubber material, if applied to handgrip 13, allows the user to comfortably grasp handgrip 13. While in FIG. 1 the handgrip 13 is shown to be substantially rounded, one of ordinary skill would realize that handgrip 13 may take any shape and have edges.

Protective shield 20 is also attached by means well known within the art to base 12 and is substantially curved. While protective shield 20 is, preferably, permanently attached to base 12, in other embodiments, protective shield 20 may be releasably attached by means well known within the art. Protective shield 20 covers the opening 18 between base 12 and handgrip 13. When a user grasps handgrip 13 the protective shield 20 protects the user's hand while the present invention 10 is being used. Protective shield 20 may be painted in actual life-like colors or, in other embodiments, the aforementioned piece could be produced in a bright color such as, but not limited to, hunter orange in order to increase their visibility to other hunters and improve the safety of the present invention 10.

Attached to base 12 is at least one pair of members 11 each of which have at least one elongated member 14 that gradually tapers to tip 15. While FIG. 1 shows a front view of the present invention 10, one of ordinary skill would readily realize that each elongated member 14 may be in different planes and that each elongated member 14 may vary in length and curvature. The elongated members 14 and the members 11 may be painted in actual life-like colors or, in other embodiments, the aforementioned pieces could be produced in a bright color such as, but not limited to, hunter orange in order to increase their visibility to other hunters and improve the safety of the present invention 10.

In an alternative embodiment, both of the members 11 and the elongated members 14 may be painted in actual life-like colors while tip 15 may be painted in a bright color such as, but not limited to, hunter orange.

Attached to both the base 12 and handgrip 13 of the present invention 10 is accessory hoop 17. When the present invention 10 is not in use, a user may attach a rope, or the like, to each accessory hoop 17 to assist the user when carrying the present invention 10. Additionally, when the user is carrying the present invention 10, a cap made of rubber, or the like, may be placed on tip 15 in order to decrease the likelihood of unwanted emissions of noises at inopportune moments.

FIGS. 2A (left hand) and 2B (right hand) show side views of the present invention 10 having base 12, handgrip 13, at least one pair of members 11 each of which have at least one elongated member 14 that gradually tapers to tip 15, and protective shield 20. It should be appreciated that protective shield 20 is substantially curved so that if tip 15 strikes protective shield 20, the tip will not strike the user's hand. The protective shield 20 overlies opening 18 and thumbhole 19 so that a tip 15 of the present invention may not inadvertently gore the user. Thus, protective shield 20 allows a user to use the present invention 10 in a safe manner. It should also be appreciated that element 14 is in different planes wherein their position of placement allow for a realistic sound of antler clash by allowing the at least one pair of members to fully vibrate without interference.

Figure 3B:
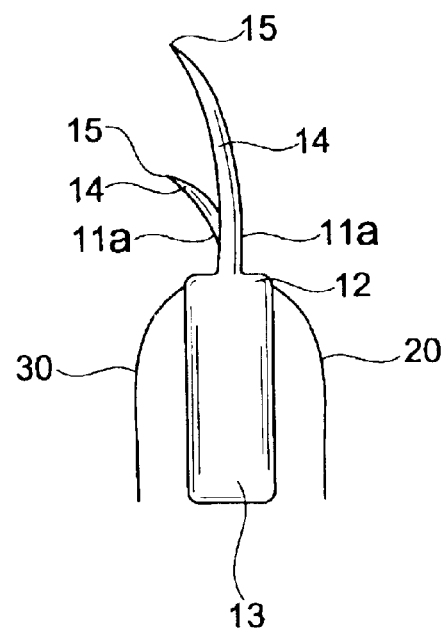

FIGS. 3A and 3B show side views of an alternative embodiment of the present invention 10 having base 12, handgrip 13, at least one pair of members 11 each of which have at least one elongated member 14 that gradually tapers to tip 15, and protective shield 20, 30. In this embodiment, protective shield 20, 30 is attached to either side of the present invention thereby protecting the user's hand or arm from injury. It should be appreciated that protective shield 20, 30 is substantially curved so that if tip 15 strikes protective shield 20, 30, the tip will not strike the user's hand and, instead, the present invention will glance off protective shield 20, 30. The protective shield 20, 30 substantially covers opening 18 and thumbhole 19 so that a tip 15 of the present invention may not inadvertently gore the user. Thus, protective shield 20 allows a user to use the present invention 10 in a safe manner. It should also be appreciated that element 14 is in different planes wherein their position of placement allow for a realistic sound of antler clash by allowing the at least one pair of members 11 to fully vibrate without interference.

In order to use the present invention 10, the user places their right hand through hole 18, grips handgrip 13 and places their thumb within thumbhole 19 in the FIG. 1B device. The user repeats the same process with their left hand in the FIG. 1a device. It should be appreciated that the right hand is grasping the present invention in which at least of pair of members 11a is attached thereto and the left hand is grasping the present invention in which at least one pair of members 11b is attached thereto. In order to use the present invention, after gripping each handgrip 13 with the user's respective hands, the user strikes the present invention 10 together. After striking the present invention 10, the present invention 10 vibrates fully creating a realistic sound.

Although the battling bucks and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim my invention is:

1. An apparatus for attracting animals comprising:
   a base and handgrip,
   said base and handgrip are connected together by a pair of side members,
   a hole formed and bounded by said base, said pair of side members and said handgrip,
   at least one additional pair of members connected to said base,
   said at least one additional pair of members being connected to said base on a side of said base that is opposite from where said pair of side members are connected to said base,
   said at least one additional pair of members have at least one elongated member connected thereto, and
   a bar attached between said handgrip and one of said pair of side members,
   a second hole formed and bounded by said bar, handgrip and one of said pair of side members.

2. An apparatus as claimed in claim 1 wherein a shield is attached to said base.

3. An apparatus as claimed in claim 2 wherein said shield substantially covers said first and second holes.

4. An apparatus as in claim 1 wherein said at least one elongated member has at least one tip positioned at an end of said at least one elongated member.

5. An apparatus as in claim 4 wherein said tip is painted a bright color.

6. An apparatus as in claim 1 wherein said base and said handgrip are substantially parallel to each other.

7. An apparatus for attracting animals comprising:
   a base and handgrip,
   said base and handgrip are connected together,
   a hole formed between said base and said handgrip,
   at least one pair of members connected to said base,
   said at least one pair of members have at least one elongated member connected thereto, and
   a shield is attached to said base,
   said shield substantially covers said hole, and
   wherein said base and said handgrip are substantially parallel to each other.

8. An apparatus for attracting animals comprising:
   a base and handgrip,
   said base and handgrip are connected together,
   a hole formed between said base and said handgrip,
   at least one pair of members connected to said base,
   said at least one pair of members have at least one elongated member connected thereto, and
   a shield is attached to said base,
   said shield substantially covers said hole, and
   wherein said base and handgrip are connected by a pair of side members,
   said base, handgrip and pair of side members forming an open area, said open area being substantially covered by a shield.

* * * * *